(12) United States Patent
Bagepalli et al.

(10) Patent No.: US 8,730,980 B2
(45) Date of Patent: May 20, 2014

(54) ARCHITECTURE FOR SCALABLE VIRTUAL NETWORK SERVICES

(75) Inventors: Nagaraj Bagepalli, Fremont, CA (US); Abhijit Patra, Saratoga, CA (US); David Chang, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 13/337,379

(22) Filed: Dec. 27, 2011

(65) Prior Publication Data

US 2013/0163606 A1    Jun. 27, 2013

(51) Int. Cl.
    *H04L 12/56*    (2011.01)
(52) U.S. Cl.
    USPC ..................... 370/409; 370/395.53
(58) Field of Classification Search
    USPC .............. 370/395.53, 409; 709/224
    See application file for complete search history.

(56) References Cited

U.S. PATENT DOCUMENTS

| | | | |
|---|---|---|---|
| 2007/0061441 A1* | 3/2007 | Landis et al. | 709/224 |
| 2007/0067435 A1* | 3/2007 | Landis et al. | 709/224 |
| 2010/0054260 A1* | 3/2010 | Pandey et al. | 370/395.53 |
| 2012/0185853 A1* | 7/2012 | Haviv et al. | 718/1 |

OTHER PUBLICATIONS

Cisco Systems, Inc., VMware, Inc., "Joint Cisco and VMware® Solution for Optimizing Virtual Desktop Delivery," 2008.

* cited by examiner

*Primary Examiner* — Albert T Chou
(74) *Attorney, Agent, or Firm* — Edell, Shapiro & Finnan, LLC

(57) ABSTRACT

Techniques are provided to start a virtual service node that is configured to provide network traffic services for one or more virtual machines. The virtual service node has at least one associated service profile comprising identifiers for corresponding service policies for network traffic services. The service policies identified in the at least one associated service profile are retrieved. A virtual machine is started with an associated virtual interface and a port profile is applied to the virtual interface, including information identifying the service profile. Information is provided to the virtual service node that informs the virtual service node of network parameters and assigned service profile of the virtual machine. Network traffic associated with the virtual machine is intercepted and redirected to the virtual service node. A virtual service data path is provided that enables dynamic service binding, virtual machine mobility support, and virtual service node chaining and/or clustering.

24 Claims, 15 Drawing Sheets

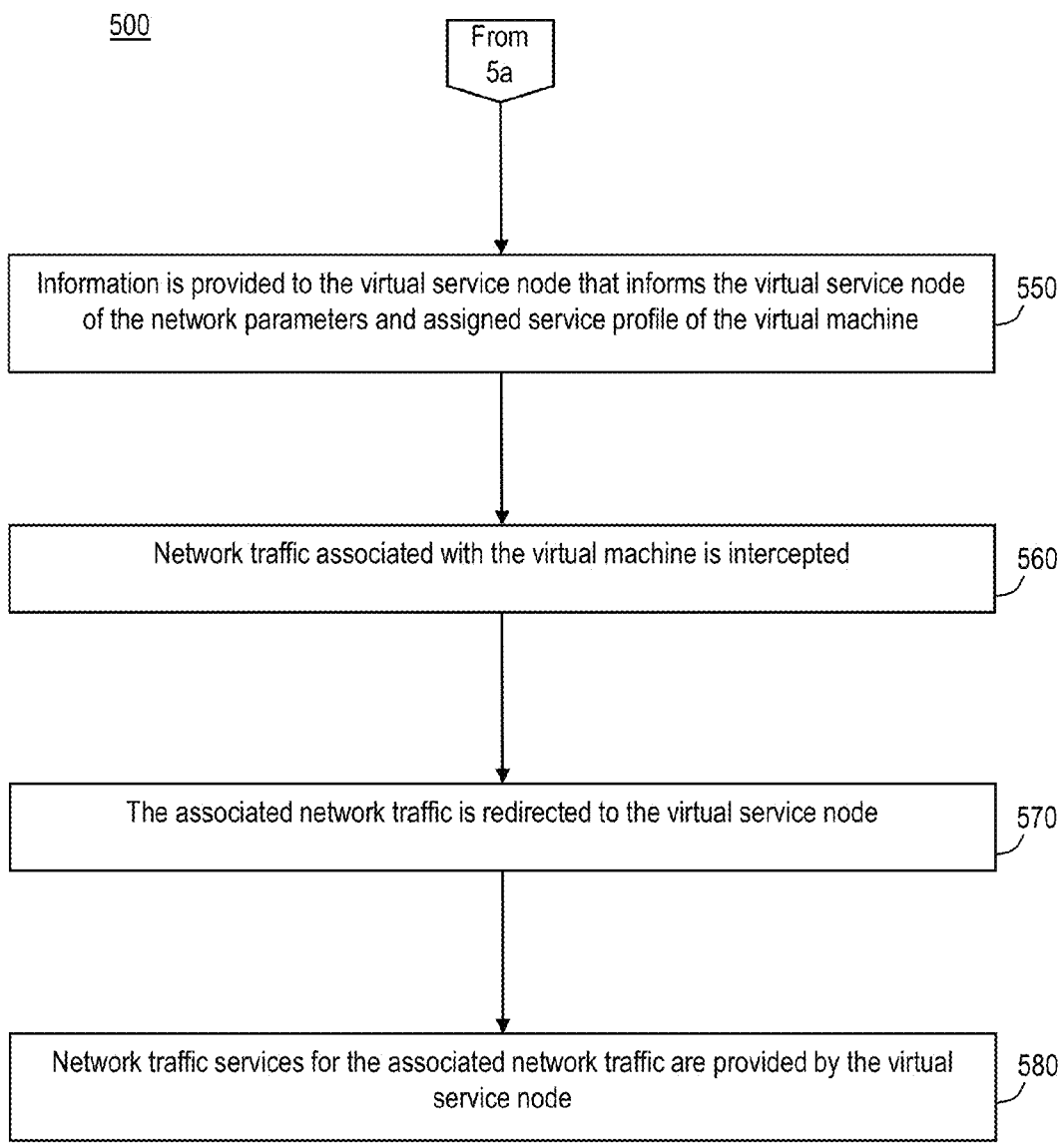

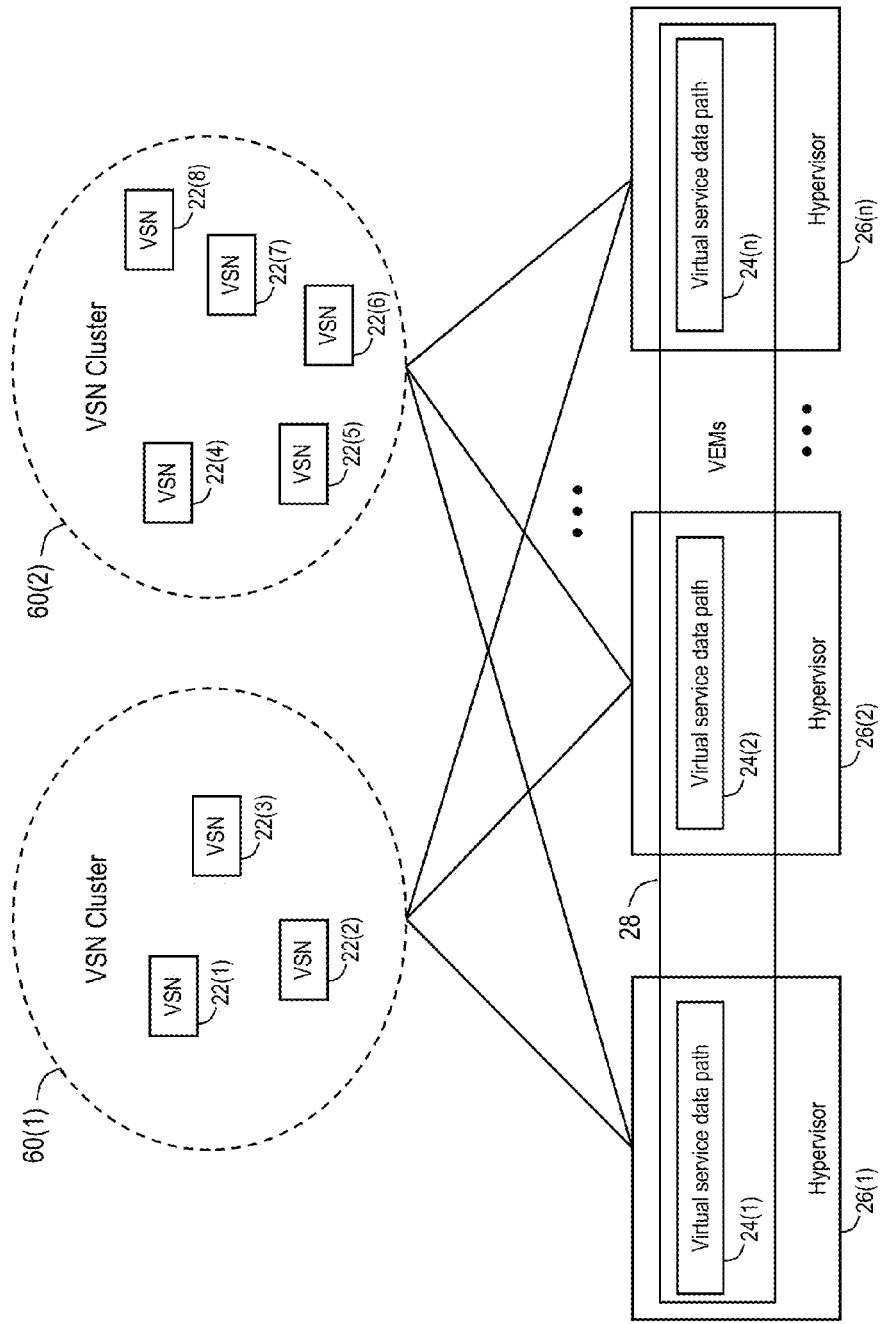

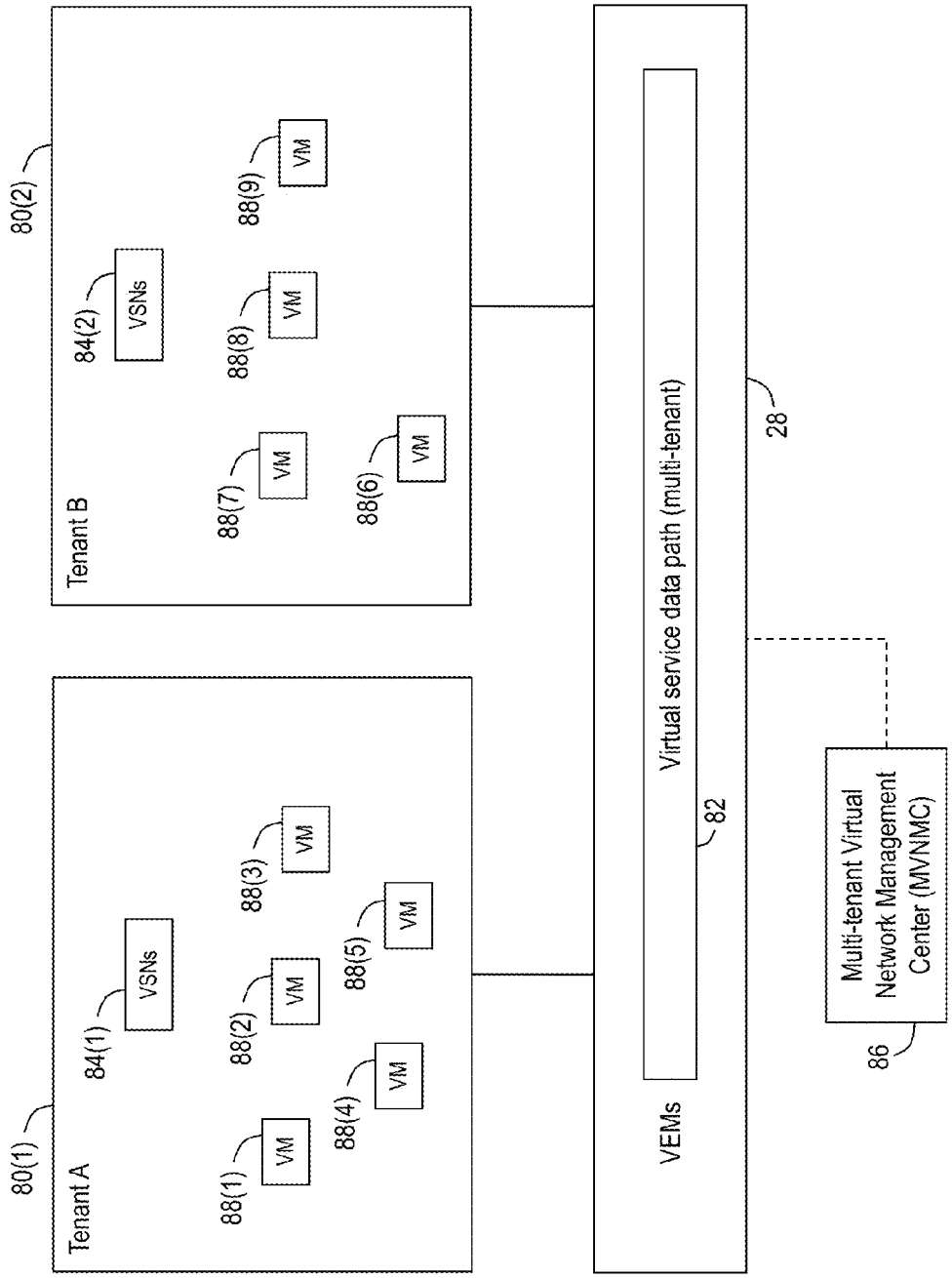

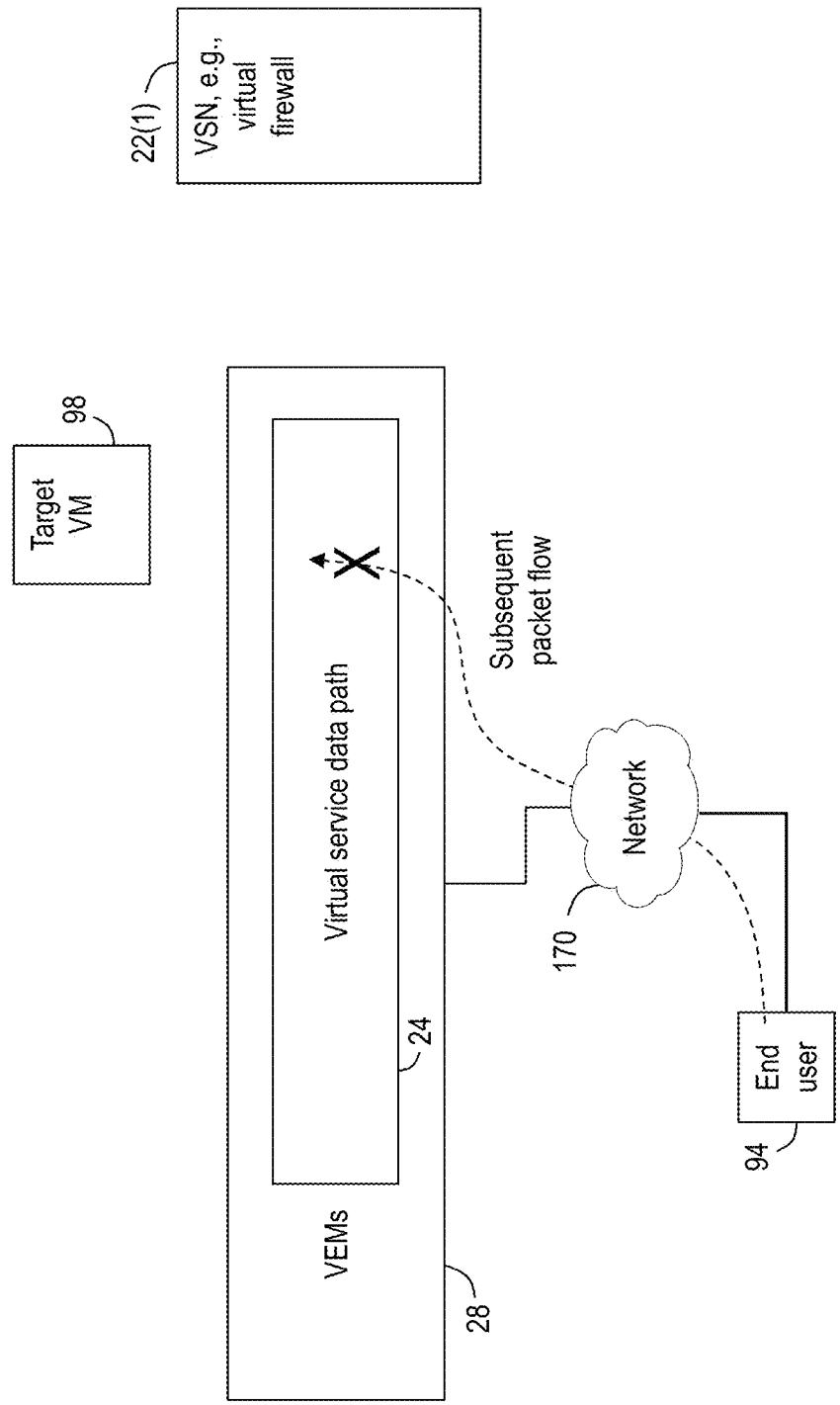

ARCHITECTURE FOR SCALABLE VIRTUAL NETWORK SERVICES

TECHNICAL FIELD

The present disclosure relates to virtualized network services.

BACKGROUND

Data centers may host applications and store large amounts of data for an organization or multiple organizations. An enterprise data center or "cloud" may be privately owned and discretely provide services for a number of customers, with each customer using data center resources by way of private networks. In addition, these data centers provide server and desktop virtualization that is dramatically changing the enterprise network by creating many "virtual networks" which connect virtual machines and the physical networks through virtual switches. In this new network paradigm, many new network services requirements are imposed on modern Information Technology (IT) network infrastructure.

These service requirements, e.g., load balancing, Wide Area Network (WAN) acceleration, network security, etc., have traditionally been provided by inline network appliances, referred to as service nodes. These inline network appliances do not scale well in virtualized network environment in which end point applications are provided by virtual machines. At any given point in time, virtual machines are being instantiated, stopped, and dynamically migrated to another physical host. Accordingly, the network services should support dynamic provisioning, scalability, and virtual machine mobility.

BRIEF DESCRIPTION OF THE DRAWINGS

FIGS. 5a and 5b depict a flowchart of a process for providing network traffic services for VMs using a VSN.

FIG. 6 is an example of a block diagram of relevant portions of the network from FIG. 2 in which a plurality of VSNs of like function load share network traffic services.

FIG. 8 is an example of a block diagram in which a plurality of VSNs provide network traffic services in a multi-tenant data center environment.

FIGS. 9a-9d are example block diagrams that illustrate VSN network traffic service decision caching at a virtual switch.

DESCRIPTION OF EXAMPLE EMBODIMENTS

Overview

In a virtual network, techniques are provided to start a virtual service node that is configured to provide network traffic services for one or more virtual machines. The virtual service node has at least one associated service profile comprising one or more identifiers for corresponding service policies that define the network traffic services. The service policies identified in the at least one associated service profile are retrieved. A virtual machine is started with an associated virtual interface and a port profile is applied to the virtual interface. The port profile comprises information configured to identify the service profile to the virtual service node. Information is provided to the virtual service node that informs the virtual service node of network parameters and assigned service profile of the virtual machine. Network traffic associated with the virtual machine is intercepted and redirected to the virtual service node. Network traffic services for the associated network traffic are provided by the virtual service node.

Example Embodiments

Figure 1:
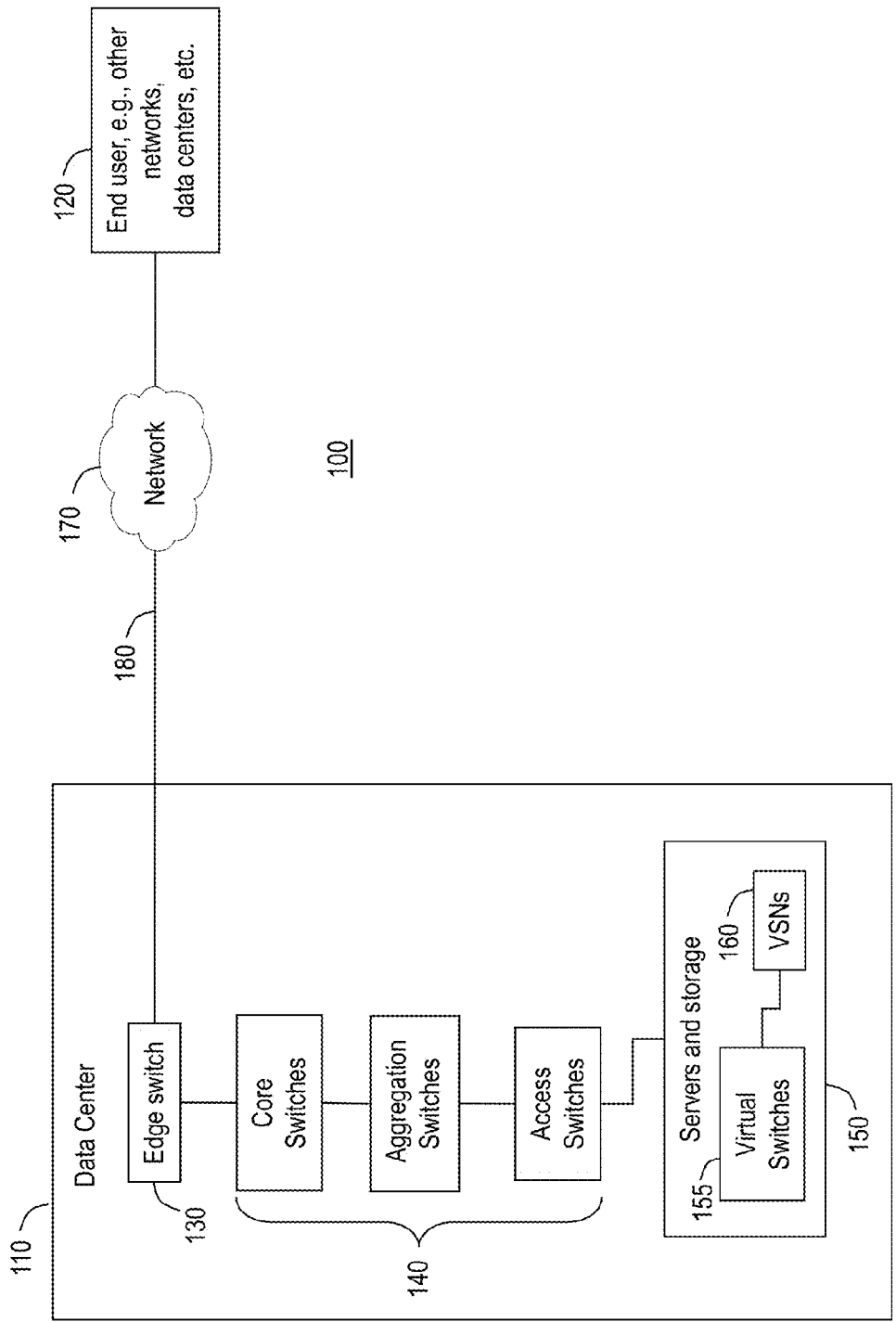
FIG. 1 is an example of a block diagram of a network with a data center and end users coupled by a Wide Area Network (WAN), where servers in the data centers are configured to employ virtual service nodes (VSNs) according to the techniques described herein.

Referring first to FIG. 1, an example system 100 is shown for a data center and end user environment. System 100 comprises a data center 110 and an end user 120, e.g., another data center, other networks, or individual users. The data center 110 and end user 120 communicate with each other by way of links 180 over public network 170. The data center 110 employs one or more edge switches 130 for traffic ingressing or egressing the data center. The data center 110 also comprises a plurality of servers and storage devices 150. The servers, e.g., blade servers, may host application services, e.g., World Wide Web server applications or remotely hosted virtual machine (VM) applications. The storage devices may be part of a Storage Area Network (SAN).

The data center 110 further comprises core switches, aggregation switches and access switches collectively shown at reference numeral 140, to aggregate and distribute ingress (upstream traffic), and egress (downstream traffic). A plurality of switches is provided at each access, aggregation, and core level to achieve redundancy within the data center 110. In this example, the plurality of servers and storage devices 150 employ a plurality of virtual switches 155 and a plurality of virtual service nodes (VSNs) 160 to service network traffic for VMs operating therewith.

Typical services provided for network traffic may consist of load balancing and application control, WAN acceleration, network security, and network analysis and monitoring. WAN acceleration typically involves application and data acceleration, e.g., using compression techniques, to reduce hardware throughput requirements. These network traffic services have traditionally been provided by inline network appliance service nodes. However by virtue of being inline, these network appliances do not scale well in a virtualized network environment in which end user services are provided by virtual machines. At any given point in time, virtual machines are being started, instantiated, or stopped. Furthermore, these VMs may migrate from one physical host to another.

According to the techniques provided herein, service nodes are virtualized, i.e., VSNs are created, in such a manner that they too may be started, instantiated, stopped, or migrated. Accordingly, the network services can be scaled to the level of VM network traffic to meet current demand without the use of fixed network appliances.

In addition to scaling, the policies enforced by various VSNs need to be up to date. The traditional approach of writing policies using static network constructs like Virtual Local Area Network (VLAN) identifiers and Internet Protocol (IP) addresses is not manageable in a dynamic virtualized environment. The techniques described herein allow network service policies to be written using invariant attributes of the VM rather than network attributes like IP addresses. Virtualization provides such invariant attributes in the form of VM attributes, and hence, by writing network service policies using VM attributes, newly provisioned servers will inherit the policies written for the VM attributes associated with that VM. For example, based on the VM attribute Operating System (OS)-Type, an administrator can group the VMs into, e.g., two zones, a linux-VM-zone and windows-VM-zone. The administrator can then write policies based on these zones rather than IP addresses. Once the policies are written using zones, the newly provisioned servers which belong to these zones (based on its OS-Type VM attribute) inherit the policies applicable for that zone.

In some virtualization environments, a port profile mechanism is used to dynamically provision network parameters for each VM. The same port profile mechanism can be extended to carry the service configuration information so that each VM is dynamically provisioned with the network service policies when the port profile is attached to the VM. This mechanism is similar to associating an Access Control List (ACL) or Quality of Service (QoS) policies with the port profile. The information related to a network service configuration can be set up in a separate profile called a service profile that can be attached to the corresponding port profile.

Figure 2:
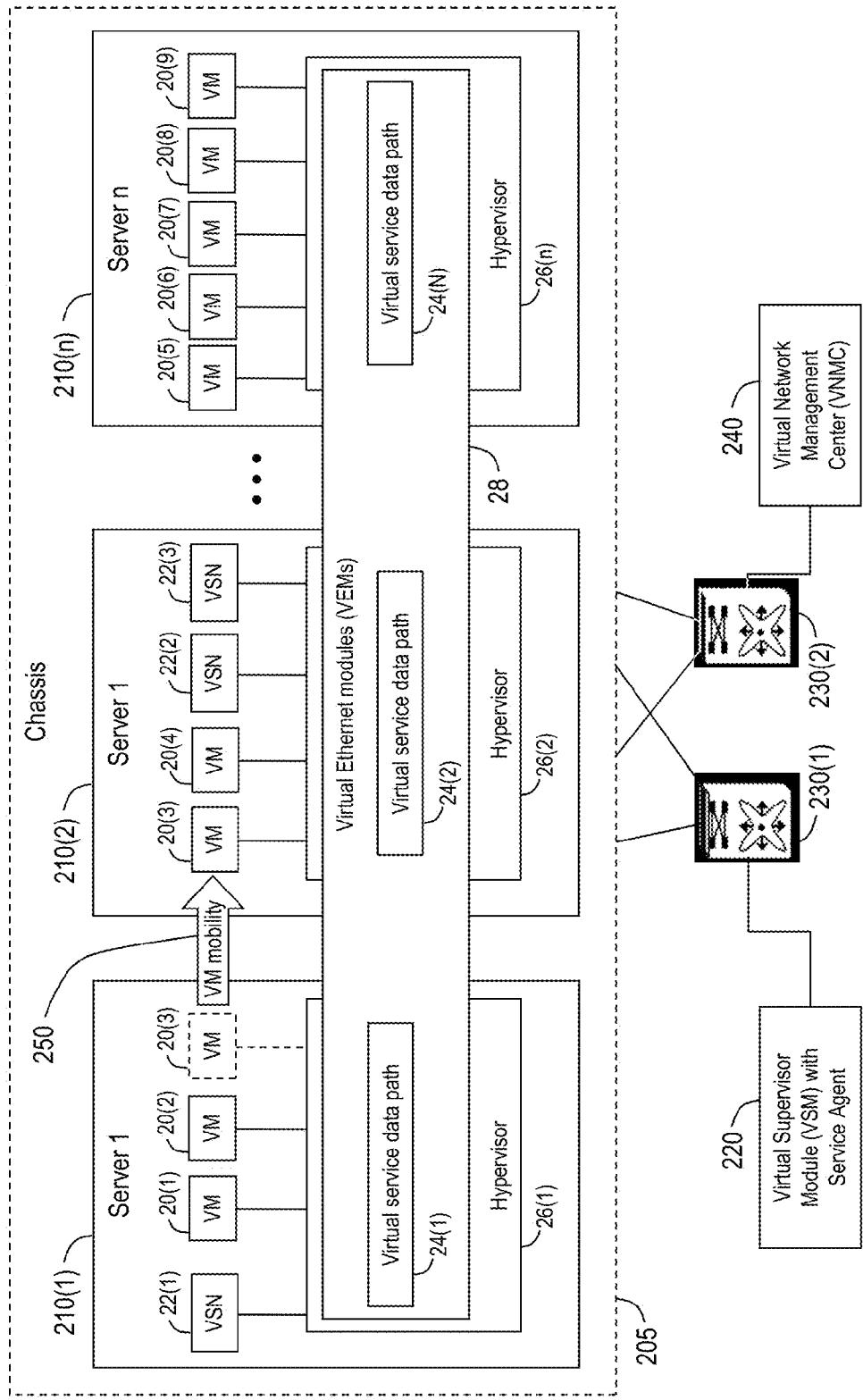
FIG. 2 is an example of a block diagram of relevant portions of the network from FIG. 1 in which VSNs are dynamically deployed according to the techniques described herein.

Turning to FIG. 2, relevant portions of a virtualized environment of a data center, e.g., data center 110, is shown. The environment comprises a virtual supervisor module (VSM) 220, switches 230(1) and 230(2), a virtual network management center (VNMC) 240, and a chassis 205 that houses a plurality of servers 210(1)-210(n). Each of the servers 210(1)-210(n) host hypervisors 26(1)-26(n), respectively. As used herein, n represents any quantity of items referred to and may vary from item to item. Hypervisors are hardware abstraction layers that provide operating system independence for application services provided by VMs. Hypervisor 26(1) supports a VSN 22(1) and VMs 20(1) and 20(2). Likewise, hypervisor 26(2) supports VSNs 22(2) and 22(3), and VMs 20(3)-20(4), and hypervisor 26(n) supports a plurality of VMs 20(5)-20(9). VMs 20(1)-20(9) may provide application and services, e.g., one or more private networks in a private cloud for end users, e.g., end users 120 (FIG. 1). In this example, VM 20(3) was targeted for and has been migrated from hypervisor 26(1) to hypervisor 26(2).

Each hypervisor 26(1)-26(n) has a virtual switch that performs switching at layer 2 of the Open Systems Interconnect (OSI) model. The virtual switch is referred to herein as a Virtual Ethernet Module (VEM) and also performs some Quality of Service (QoS), security and monitoring functions. In this example, the VEMs also perform layer 3 switching and can operate as a single unit across hypervisors, as shown at reference numeral 28. Each hypervisor 26(1)-26(n) also has a virtual service data path (VSDP) 24(1)-24(n), respectively.

VEMs 28 provide switching and other services for VMs 20(1)-20(9), e.g., inter-VM routing and switching for VM ingress and egress network traffic, while the VSDPs 24(1)-24(n) provide a dedicated traffic pathway for services provided by VSNs 22(1)-22(3). The VSDPs 24(1)-24(n) may be in the form of a service overlay, e.g., a layer 2/3 overlay tunnel. The VSDPs 24(1)-24(n) also give the VSNs mobility that allows them to migrate from one server to another without routing traffic through an inline appliance. By the use of a VEM and VSDP architecture, any of the VSNs 22(1)-22(3) may provide services for any of the VMs 20(1)-20(9). Accordingly, when a VM mobility event occurs, e.g., VM mobility event 250 for VM 20(3), VSNs that were providing network traffic services for VM 20(3) when it was running on server 210(1) will also provide those same services when VM 20(3) is running on server 210(2).

The VSM 220 allows a network team to manage the virtualization environment and to manage network policies by way of port profiles as described herein. The VSM 220 employs a service agent (SA) to facilitate the functions of the VSM 220 and will be further described later. The VNMC 240 is used by a security/server team to manage the various VMs, security policies and VSNs, e.g., virtual firewalls using service profile that encompass security policies. For ease of use, VNMC 240 provides a graphical user interface (GUI) for device and policy management.

Figure 3:
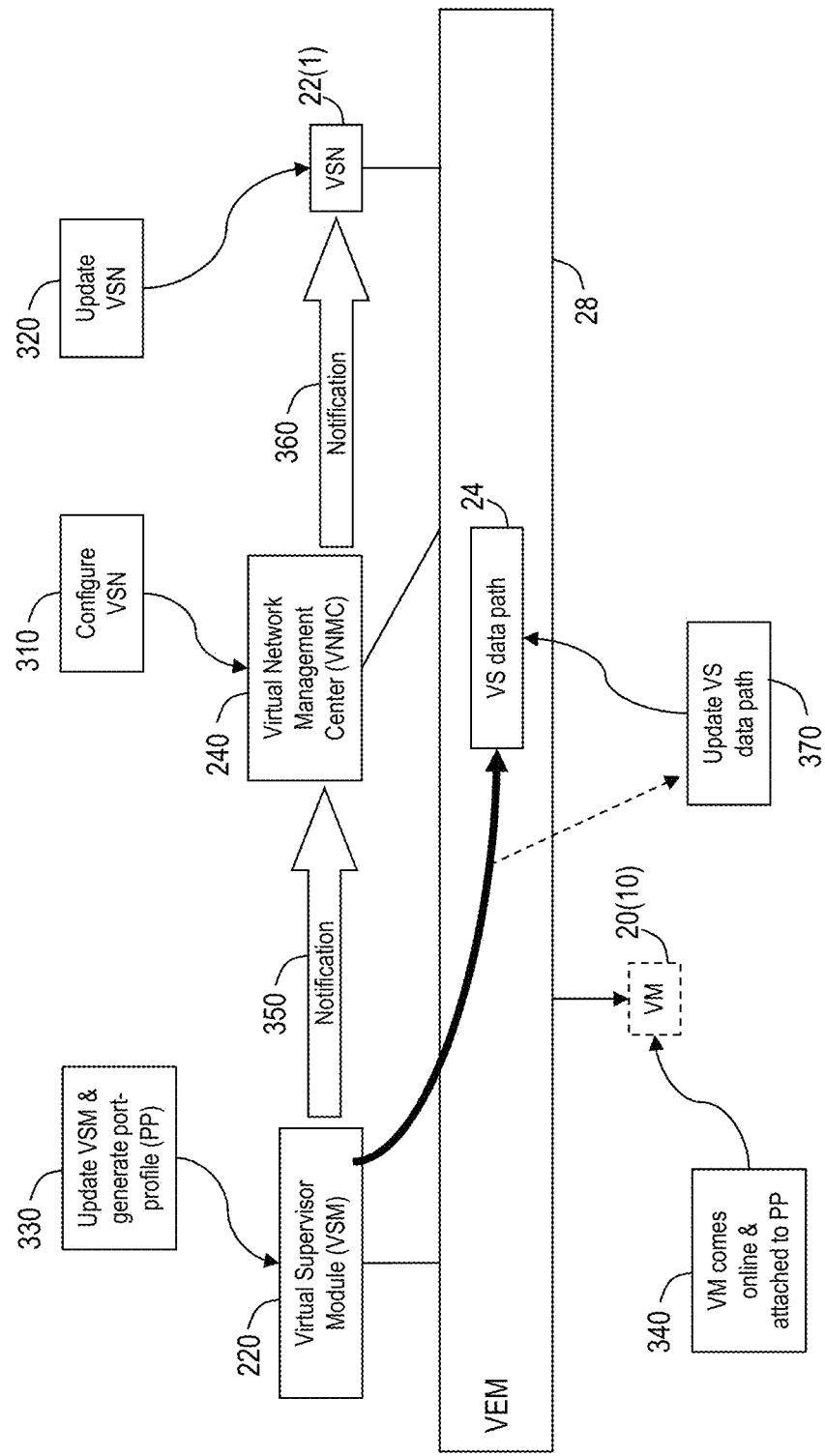
FIG. 3 depicts a flow diagram for provisioning network traffic services for a virtual machine (VM) using a VSN.

Referring to FIG. 3, a flow diagram for provisioning network traffic services for a VM using a VSN will now be described. At 310, a VSN, e.g., VSN 22(1), is activated and configured by VMNC 240. Configuration of VSN 22(1) includes assignment of an Internet Protocol (IP) address and a predefined service profile. The service profile is a predefined container or object that identifies network policies that the VSN will enforce. For example, if the VSN is provisioned to enforce a Linux operating system zone, then the VSN will not allow traffic from other operating systems, e.g., Windows, to access VM that is part of the Linux zone.

At 320, VSN 22(1) updates its operating parameters to be in compliance with the provided configuration. For example, VSN 22(1) may employ a profile table which enumerates the various service profiles for which VSN 22(1) is responsible. Further, these service profile tables may be translated into a policy table that enumerates the individual network policies. Accordingly, an update may include updating the profile and policy tables. The tables may be in the form of a database table for which VSN 22(1) may initiate a database query to retrieve the underlying information. The database being queried may be local to the server, chassis, or remotely located.

At 330, the VSM 220 manages port profiles used by VMs, including VSNs. Port profiles are defined and stored. The network administrator can then assign or bind a service profile to a port profile. Thus, at 340, when a VM comes online, e.g., VM 20(10), the VM will be attached to a port profile. As each VM, including VSNs, comes online it is also assigned a virtual Ethernet port (vEth) number that is a VEM port and maps to the VM's virtual network interface card (vnic), i.e., the VM 20(10) is bound to the VEM 28. The virtual Ethernet port identifier (ID) may be in the form of (VEM ID, port ID).

At 350, VSM 220 notifies VNMC 240 that VM 20(10) has come online and provides the VM's IP address and service profile information. At 360, the VM's IP address and service profile information is forwarded to VSN 22(1). At 370, the VSDP 24 is updated with the VM 20(10) to VEM 28 binding information so that its internal tables may be updated. In other words, the VEM 24 and VSDP 24 acting as switch forwarding and service overlay forwarding units, respectively, update their internal forwarding (flow) and service lookup tables to accommodate data, control plane, and service functions for the newly added VM 20(10). Some of the functions described above need not follow the order presented, e.g., any definitions may be performed in advance.

It should be understood that the architecture and functions presented in connection with FIGS. 2 and 3, are by way of example, and the functions described do not necessarily attach to any particular component and variations may be present. Accordingly, whether a VM or VSN migrates from one physical host to another, their virtual Ethernet port assignments do not change and traffic is forwarded without interruption, i.e., the VSN-to-VM pairing remains regardless of migration, i.e., until the pairing is changed.

Additional features of the above described architecture will now be described. For example, the VNMC 240 is a multi-VSN device and policy manager. VNMC 240 provides a graphical user interface for device and policy management and is a central point of the integrated techniques that facilitate the communication across different components in the system, e.g., the VSM, VSNs, and a VM management control center. VNMC 240 controls multiple instances of VSNs. Apart from the policy configuration and monitoring functions provided by VNMC 240, other functions include interfacing with the VM management control center to fetch existing VMs and their corresponding attributes.

The VMNC 240 interfaces with VSM 220 to learn of new VMs coming online so that it can provision the appropriate policies for the newly created VM in the corresponding VSN, e.g., VSN 22(1), and allows the VSN to maintain a stateless configuration, i.e., the VSN does not maintain a bound configuration but obtains the configuration by retrieving it in mode/option form from a central repository that stores all of the policy configurations. Accordingly, when a VSN comes online, it pulls the policy configuration from the controlling VNMC or with permission from an associated database. Only a minimal configuration, e.g., IP address of the device will be stored in the VSN and the rest of the configuration will be fetched from VNMC during boot up.

The VSN is a primary system component that evaluates assigned policies for serviced network traffic. The VSN may employ a policy engine to provide services and to evaluate policies. The VSN receives traffic from the VSDP. The VSDP encapsulates the original traffic packet either with MAC-in-MAC or MAC-in-UDP header depending on whether the VSN is layer 2 or layer 3 adjacent to the VEM where traffic is intercepted. The VSN 22(1) performs application processing and evaluates policies based on traffic classification information sent by VEM 28.

In order to provide services, the VM's traffic is forwarded to the VSN for an evaluation based on the service policy provided or enforced by the VSN. The VSN may transmit the policy evaluation result to the VSDP which maintains the evaluation result in a flow table so that the VSN policy engine does not need to be invoked for each and every packet in a flow. Opportunistically, depending on the service, the VSN will instruct VSDP to fast-path the flow such that all the subsequent packets of a given flow will be short circuited by the VSDP, effectively bypassing the VSN.

Thus, one of the main functions of the VSDP is to enforce the policy result issued by VSN. The VSDP sends the appropriate traffic to the VSN based on the service classification configuration. By way of example, for a segmentation service, all the traffic from a virtual network interface card (vnic) of a given VM will be redirected to the VSN for policy evaluation. The VSDP receives the policy result from the VSN and enforces the same. Typical policy evaluation results include permitting the traffic, denying the traffic, or continue sending the traffic for additional service policy evaluations. Based on the instruction from the VSN, the VSDP will maintain the fast-path flow entry as described above.

The VSM or a service agent therein, binds the service configuration information with the port profile, interacts with the VNMC to fetch the service specific information, and publishes virtual Ethernet port attachment and detachment notifications to the VNMC so the VNMC can bind service configuration to the VM. In addition, the VSM pushes the binding to the VSDP, e.g., using a {vEth, service configuration, VSN-ID} type of binding.

Figure 4A:
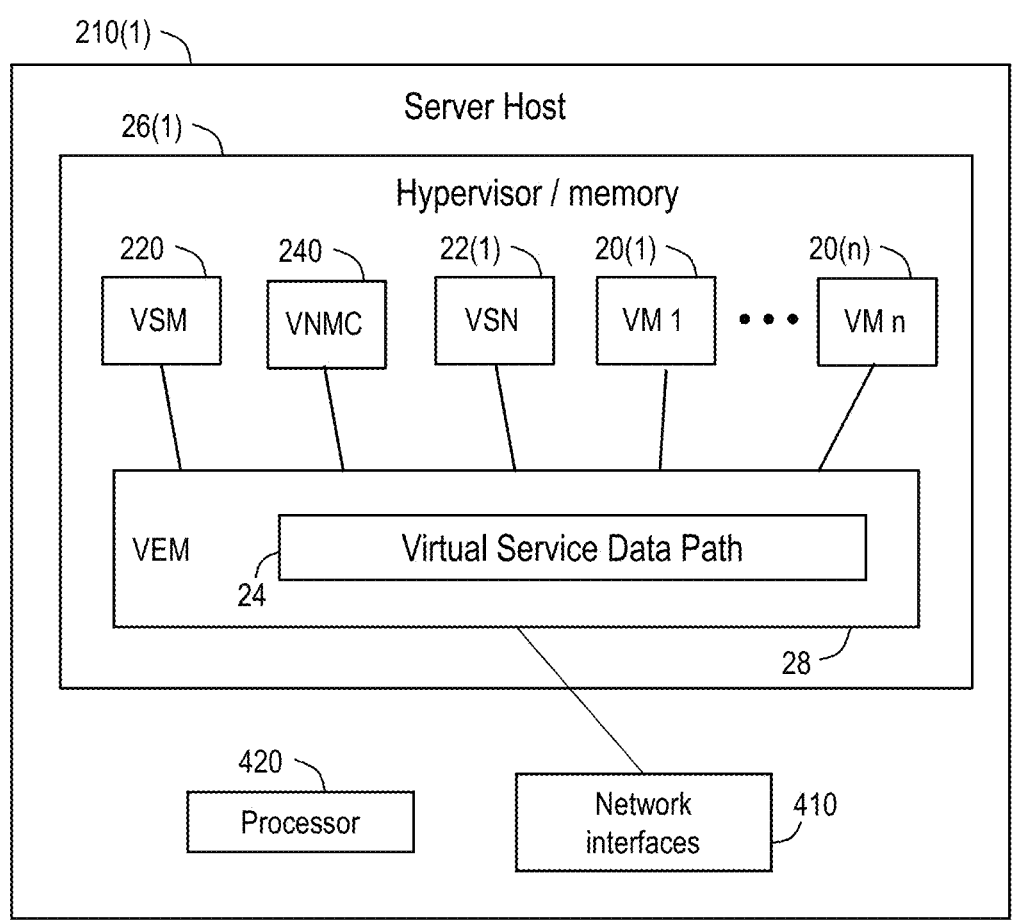
FIGS. 4a, 4b, and 4c are example diagrams of architectural variations that may be used to implement a virtual service data path that enables network traffic services for VMs using a VSN.
Figure 4B:
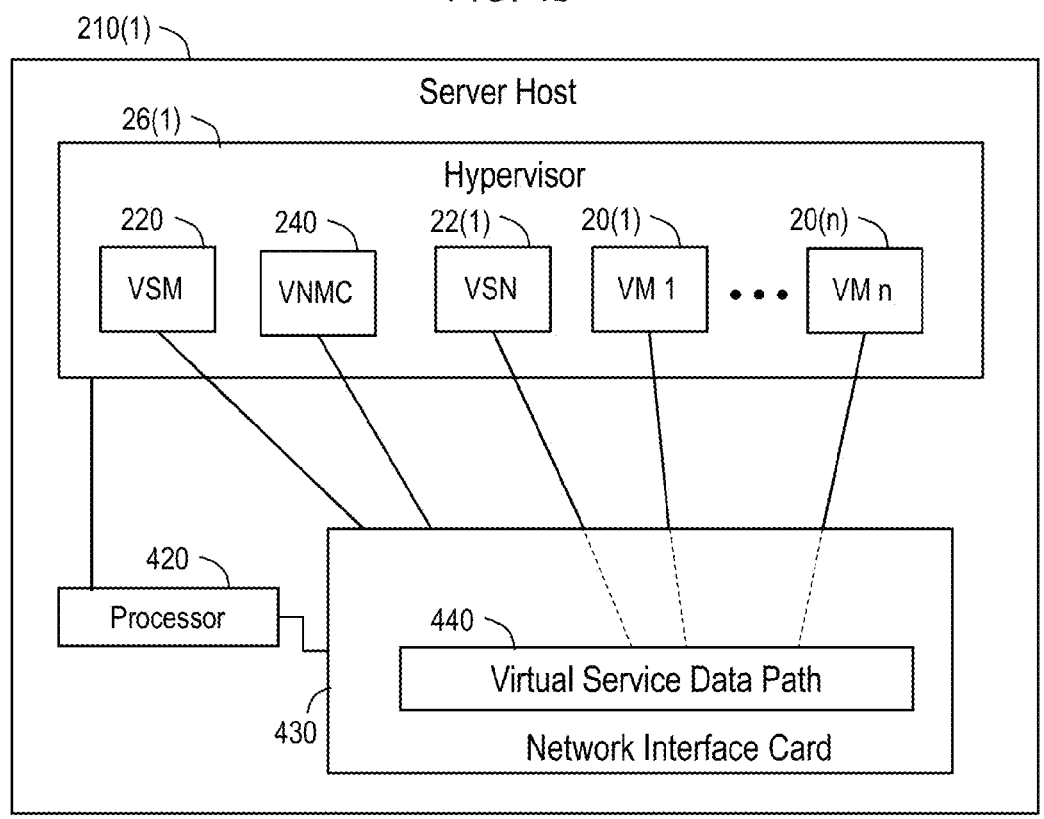
Figure 4C:
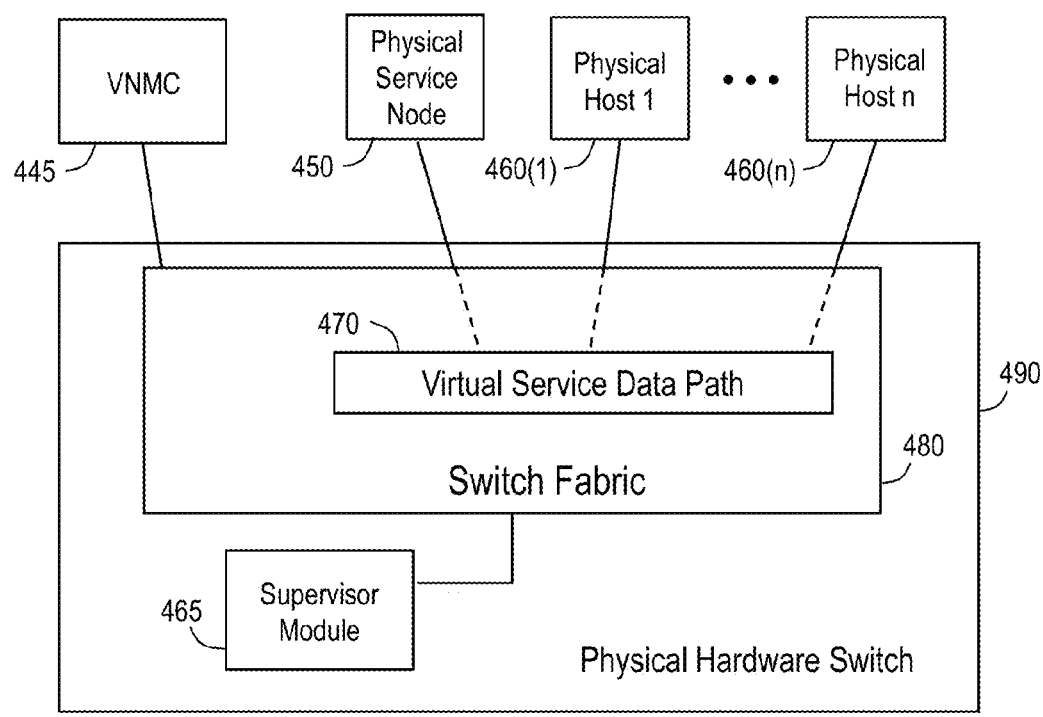

Turning now to FIGS. 4a, 4b, and 4c, example block diagrams of network appliances or servers are shown. The various example of architecture diagrams shown in FIGS. 4a-4c are meant to illustrate variations in different VSDP configurations that can employ the techniques described herein. Referring to FIG. 4a, a server host is shown, e.g., server 210(1) from FIG. 2. The server 210(1) comprises one or more network interface units 410, a processor 420, and a hypervisor 26(1) with memory for storage. The network interface units 410 are coupled to the processor 420 and are configured to transmit and receive messages over one or more networks or between servers. Additionally, the network interface units 410 are configured to support the VEM 28 and VSDP 24 across multiple servers according to the techniques described herein.

Processor 420 is coupled to the network interface units 410 and to the hypervisor 26(1). Processor 420 is a microprocessor or microcontroller that is, for example, configured to execute program logic instructions (i.e., software) for carrying out various operations and tasks described herein. Processor 420 may be configured with memory or other storage. Hypervisor 26(1) is also configured with one or more processors similar to processor 420, and is referred to herein generally as "processors". Memory used in server 210(1) may comprise read only memory (ROM), random access memory (RAM), magnetic disk storage media devices, optical storage media devices, flash memory devices, electrical, optical or other physical/tangible memory storage devices.

The functions of the processors may be implemented by logic encoded in one or more tangible computer (non-transitory) readable storage media (e.g., embedded logic such as an application specific integrated circuit (ASIC), digital signal processor (DSP) instructions, software that is executed by a processor, etc.), where memory stores data used for the operations described herein and stores software or processor executable instructions that are executed to carry out the operations described herein.

The various functions and components, e.g., VSMs and VNMCs, may take any of a variety of forms, so as to be encoded in one or more tangible computer readable memory media or storage device for execution, such as fixed logic or programmable logic (e.g., software/computer instructions executed by a processor) and the processors may be ASICs that comprise fixed digital logic, or a combination thereof. For example, the processors may be embodied by digital logic gates in a fixed or programmable digital logic integrated circuit, which digital logic gates are configured to perform the various functions described herein. In general, the components may be embodied in one or more computer readable storage media encoded with software comprising computer executable instructions and when the software is executed operable to perform the operations described herein.

Turning to FIG. 4b, a second example of a server host configuration is described. In this example, a network interface card 430 is shown that may be one of the network interfaces 410 from FIG. 4a. The functions of the Hypervisor 26(1) and the resident components as shown in FIG. 4a remain relatively the same, with the exception that VSDP functionality has been moved from the hypervisor 26(1) to the network interface card 430 and is labeled with reference numeral 440.

Referring now to FIG. 4c, a third example hardware configuration is described. A physical hardware switch 490 is deployed in the data center, e.g., data center 110 (FIG. 1). Switch 490 comprises a supervisor module 465 and a switched fabric 480. Hosted within the switched fabric 480 is VSDP 470. Switch 490 interfaces with a VNMC 445, a physical service node 450, and a plurality of physical hosts 460(1)-460(n). The VNMC 445 resides in a virtual network as a VM. Physical hosts 460(1)-460(n) support a plurality of VMs in a virtual network. In this example, VSDP 470 forwards VM traffic to physical service node 450 much in the same way that it would forward VM traffic to a VSN. Likewise, the physical service node 450 provides VSDP 470 with a policy evaluation result, e.g., permit or deny, that can be cached as described above. In this way, the VSDP 470 can provide fast-path forwarding without sending every packet to the physical service node 450.

Figure 5A:
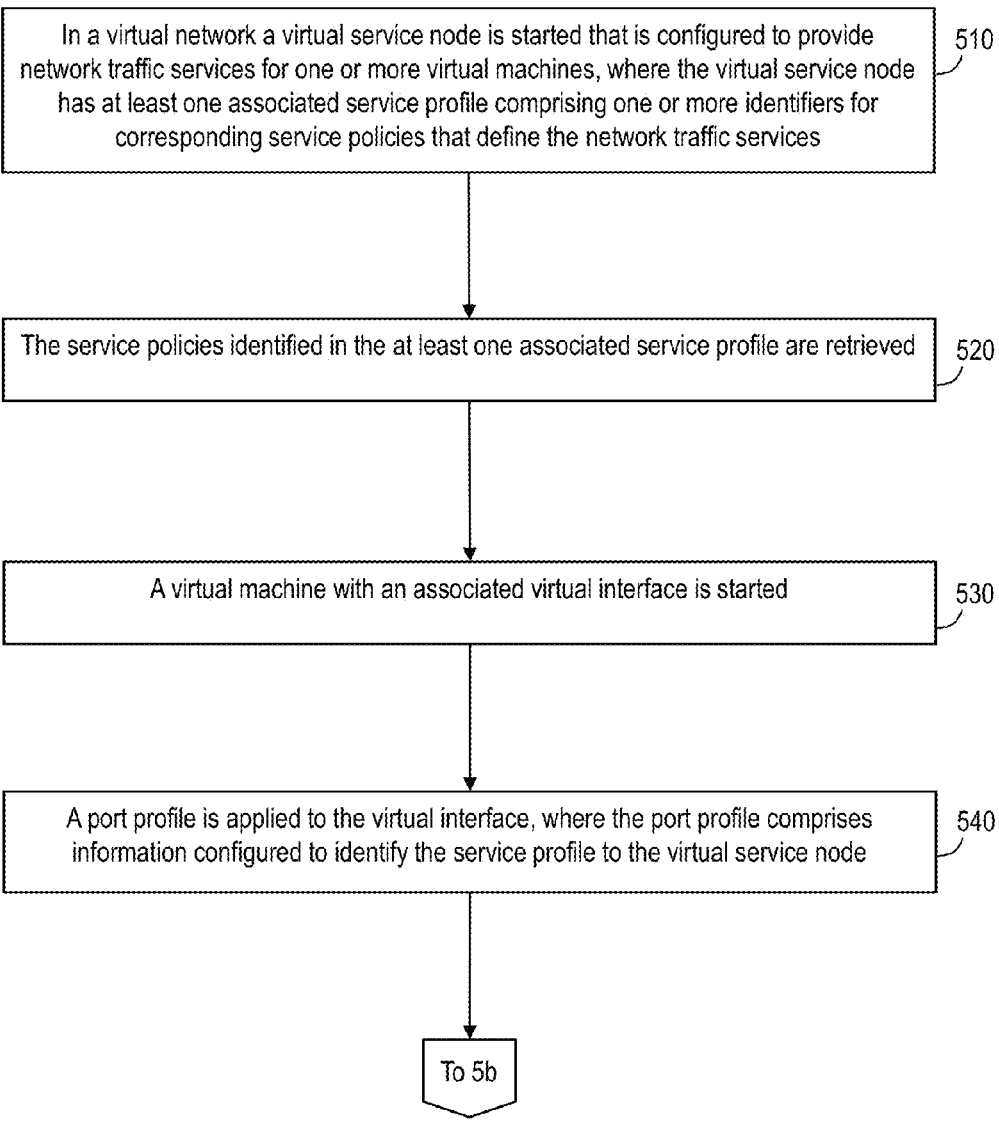

Referring to FIGS. 5a and 5b, flowcharts are provided that depict operations of the process logic 500 for providing scalable virtual network services. At 510, in a virtual network, a virtual service node is started that is configured to provide network traffic services for one or more virtual machines. The virtual service node has at least one associated service profile comprising one or more identifiers for corresponding service policies that define the network traffic services. At 520, the service policies identified in the at least one associated service profile are retrieved. At 530, a virtual machine is started with an associated virtual interface. At 540, a port profile is applied to the virtual interface. The port profile comprises information configured to identify the service profile to the VSN.

The process continues in FIG. 5b. At 550, information is provided to the virtual service node that informs the virtual service node of network parameters and assigned service profile of the virtual machine. At 560, network traffic associated with the virtual machine is intercepted, and at 570, redirected to the virtual service node. At 580, network traffic services for the associated network traffic are provided by the virtual service node.

Additional techniques are provided to redirect by routing the associated network traffic via a virtual service node specific overlay tunnel. The virtual service node specific overlay tunnel provides one of layer 2 and layer 3 network traffic tunneling. Further a message may be received from the virtual service node comprising information configured to indicate that the associated network traffic can bypass the virtual service node without being intercepted and redirected, that the associated network traffic is to be dropped, or that the associated network traffic continues to be intercepted and redirected to the virtual service node.

A plurality of virtual service nodes may be started, each provisioned with the same service profile and network traffic services are shared among the plurality of virtual service nodes. In addition, a plurality of virtual service nodes may be started, each provisioned with a different service profile and the associated network traffic is routed to respective ones of the plurality of virtual service nodes.

The VM may be migrated from a first network device to a second network device, and network traffic services for the associated network traffic are provided by the virtual service node by way of an overlay tunnel and a virtual switch configured to switch network traffic between the first and second network devices.

The VSN may be migrated from a first network device to a second network device and provide network traffic services by the virtual service node for the network traffic by way of a virtual switch configured to switch network traffic between the first and second network devices.

Information representing a plurality of service policies may be defined and stored at the VNMC. Information representing a plurality service profiles comprising one or more identifiers for corresponding service policies for one or more virtual service nodes configured to provide network traffic services may also be defined and stored at the VNMC. Information representing the port profile is generated and the service profile is assigned to the port profile prior to applying the port profile to the virtual interface. The policies may be retrieved from a central store associated with the VNMC.

It should be understood that any number of VSNs may be employed within the virtual network to accommodate current traffic conditions. In other words, VSNs may be started or instantiated when network traffic load increases, and stopped or destroyed when network traffic load decreases.

Turning now to FIG. 6, an example is shown of a block diagram of relevant portions of the network from FIG. 2 in which a plurality of VSNs of like function load share network traffic services. In this example, VSNs are conceptually grouped into two clusters 60(1) and 60(2). VSNs 22(1)-22(3) are grouped into cluster 60(1) and perform a first type of service function, e.g., firewall services, and VSNs 22(4)-22(8) are grouped into cluster 60(2) and perform a second type of service function, e.g., WAN acceleration. The VSNs in each cluster are accessible from each of the hypervisors 26(1)-26(n) via the VEM 28 and the VSDPs 24(1)-24(n). Accordingly, VSNs in each cluster can load share for the type of service that they provide.

Figure 7:
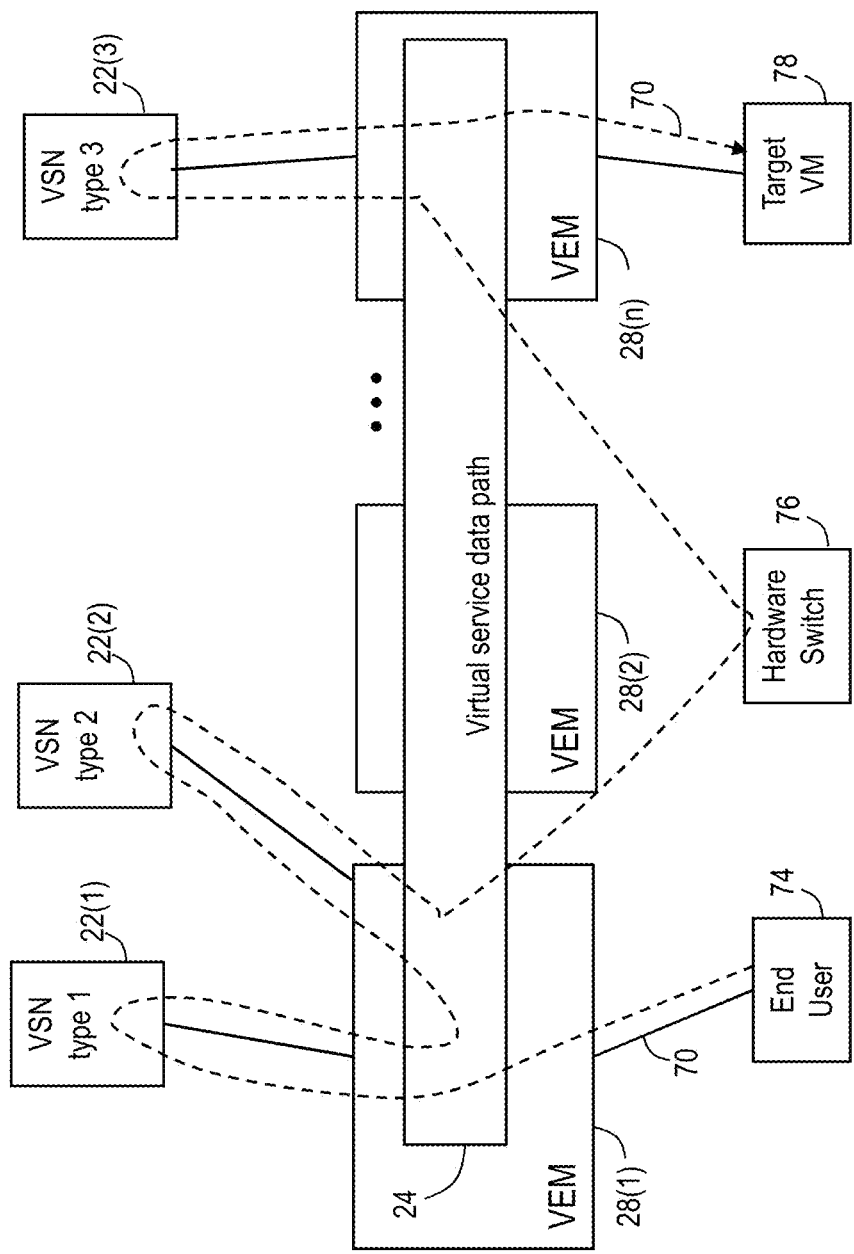
FIG. 7 is an example of a block diagram of relevant portions of the network from FIG. 2 in which a plurality of VSNs of differing function provide a plurality of different network traffic services for a single traffic flow.

Referring to FIG. 7, an example of a block diagram of relevant portions of the network from FIG. 2 in which a plurality of VSNs of differing function provide a plurality of different network traffic services, in turn, i.e., in a daisy chain like fashion. In this example, network traffic 70 is sent from an end user 74 to a target VM 78. The traffic 70 enters the virtual network via VEM 28(1) and is forwarded to VSN 22(1) by VSDP 24. VSN 22(1) performs a first type of service function and forwards traffic 70 back to the VSDP 24 by way of VEM 28(1). VSDP 24 forwards traffic 70 to VSN 22(2) which performs a second type of service function and forwards traffic 70 back to the VSDP 24.

Next, VSDP 24 forwards the traffic 70 to VEM 28(n) using Layer 2 forwarding via a hardware switch 76, and in turn, forwards traffic 70 to VSN 22(3) which performs a third type of service function. Traffic 70 is further forwarded to target VM 78. Thus, the techniques provided herein allow for both services that are distributed across switches and VEMs, and services that can be performed one after another prior to reaching a destination. VSNs for both clustering and daisy chaining may be configured on a separate VLAN.

Turning now to FIG. 8, an example of a block diagram is provided in which a plurality of VSNs provide network traffic services in a multi-tenant data center environment. In this example there are two tenants A and B, respectively. Each tenant is assigned resources that are grouped as shown at reference numerals 80(1) and 80(2). Tenant A employs a plurality of VSNs 84(1) that service a plurality of VMs 88(1)-88(5), while Tenant B employs a plurality of VSNs 84(2) that service a plurality of VMs 88(6)-88(9). In order to ensure data isolation and data integrity between Tenant A and Tenant B, the virtual network employs a multi-tenant VSDP (MVSDP) 82 and a multi-tenant VNMC (MVNMC) 86. The MVSDP 82 and MVNMC 86 add an additional layer of Tenant isolation in their respective traffic forwarding and service tables, as well as for the network management functions, i.e., a tenant key is added to the tables. The tenant key may be, e.g., a VLAN ID.

Figure 9A:
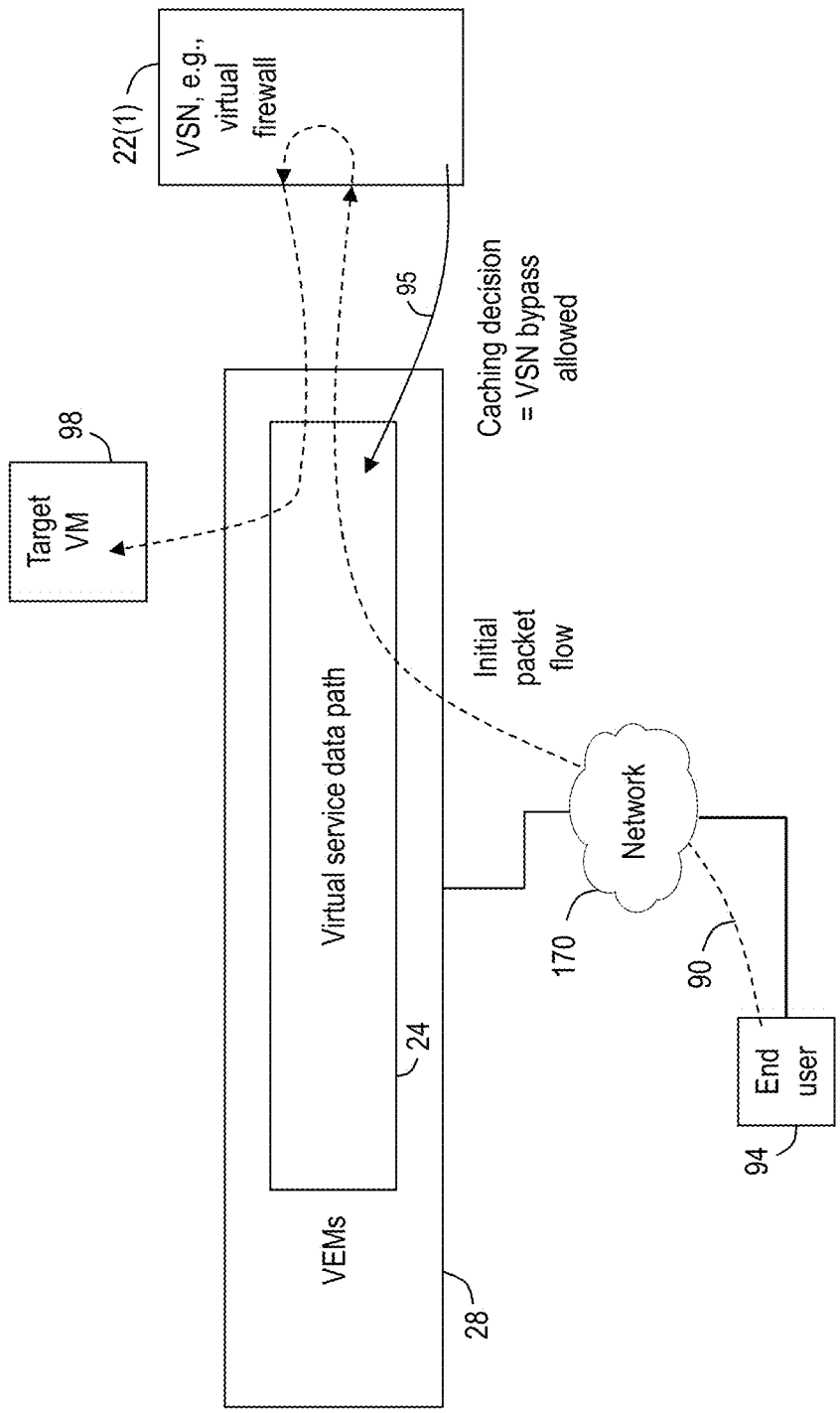

Referring to FIGS. 9a-9d, example block diagrams are provided that illustrate VSN network traffic service decision caching at a virtual switch. Referring first to FIG. 9a, a simplified view of the network from FIGS. 1 and 2 is presented. In this example, an end user 94 is sending network traffic 90 to a target VM 98. The traffic flows by way of network 170 (FIG. 1) through the data center to servers hosting VEMs 28 and VSDP 24. The traffic is forwarded to a VSN, e.g., VSN 22(1), which is acting as a virtual firewall. VSN 22(1) has analyzed traffic 90 and decided to permit or allow the traffic flow. The decision to allow traffic 90 is passed back to VSDP 24 as shown at reference numeral 95.

Figure 9B:
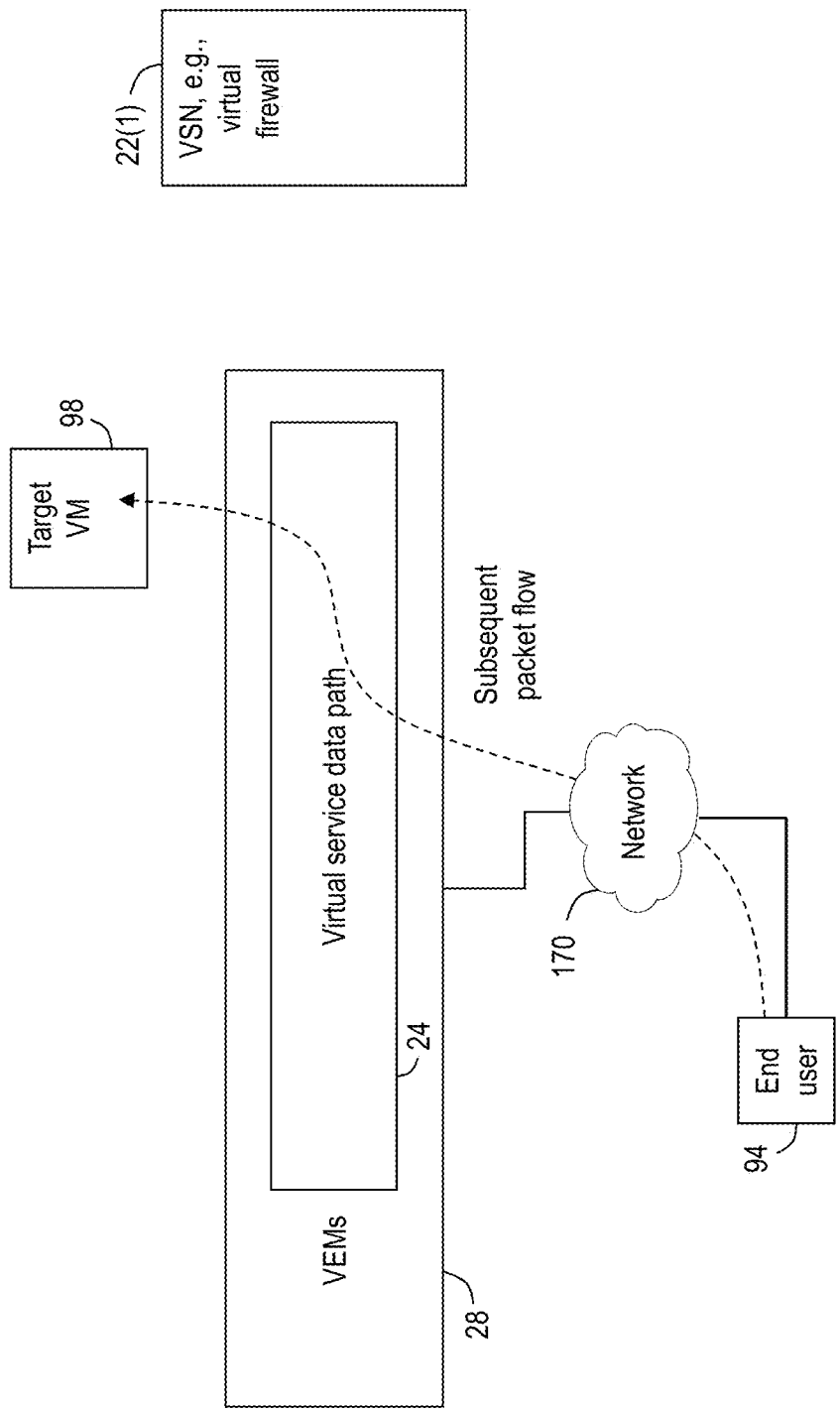

Referring to FIG. 9*b*, the network from FIG. 9*a* is shown after the decision to allow traffic 90 is cached or stored by VSDP 24. When traffic 90 has been allowed there is no longer a need for VSN 22(1) to perform firewall services for every packet. Accordingly, VSDP 24 fast-paths traffic 90 straight to target VM 98, without sending packets through VSN 22(1), as shown in the figure.

Figure 9C:
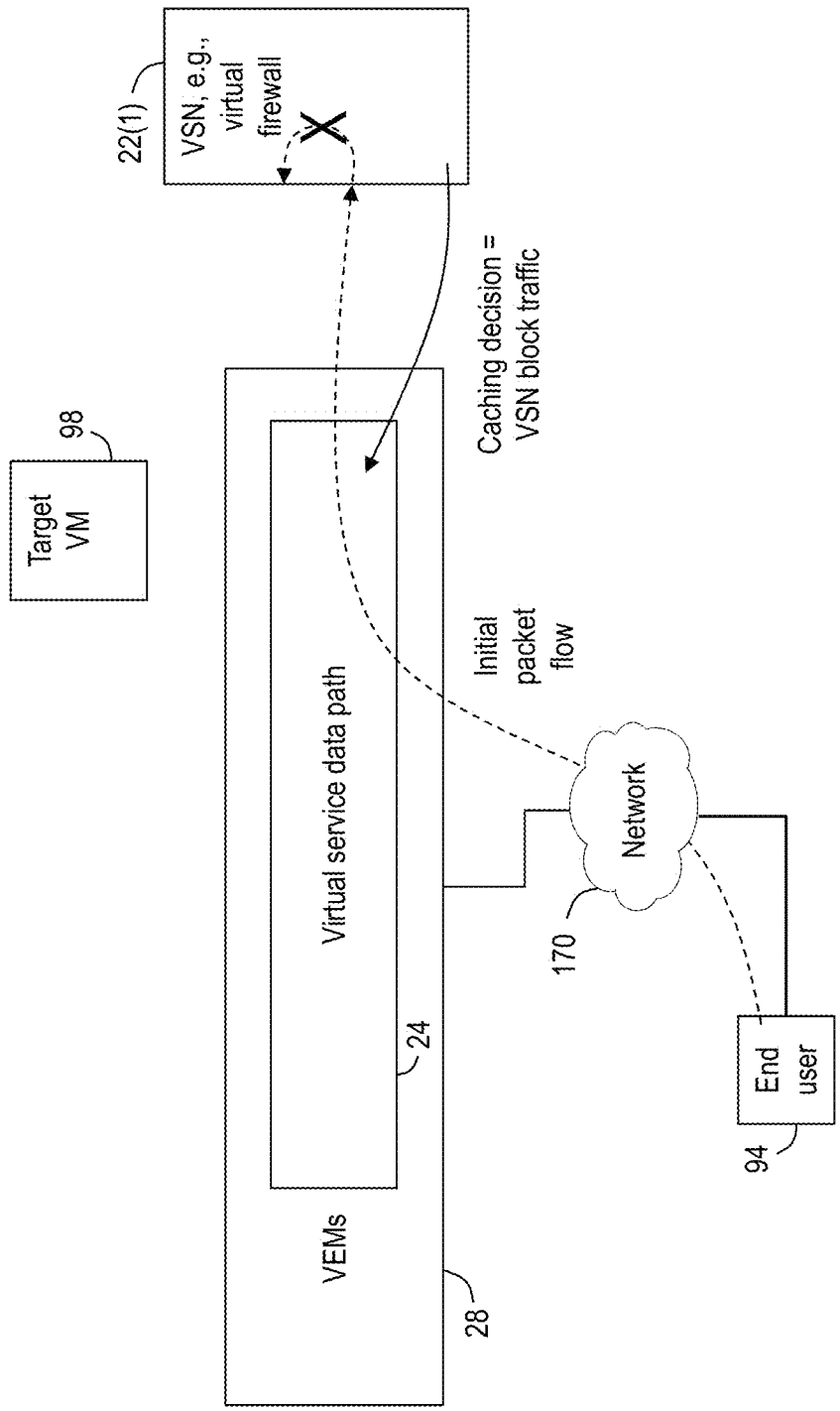

Referring to FIG. 9*c*, the network from FIG. 9*a* is shown when the decision with respect to traffic 90 is to deny the traffic. As shown in the figure, VSN 22(1) drops any packets from traffic 90 and informs VSDP 24 of the decision to deny traffic 90 as shown at reference numeral 97.

Referring to FIG. 9*d*, the network from FIG. 9*c* is shown after the decision to deny traffic 90 is cached by VSDP 24. When traffic 90 has been denied the VSDP 24 simply drops any packets associated with traffic 90, as shown in the figure. It should be understood that cached decisions need not be persistent and may expire after a period of time, after which the decision is renewed. Refreshing the cache may be initiated by either VSDP 24 or VSN 22(1).

In sum, the techniques described herein provide a VNMC as a centralized management plane, VSNs as a distributed services plane, and a VSDP as a distributed data plane. Accordingly, these techniques allow for seamless dynamic service binding, mobility of VMs and their servicing VSNs, simplification of policy implementation by using VM attributes in the policy definition, and provide complete scalability for network services by using a flexible VSN architecture.

The above description is intended by way of example only.

What is claimed is:

1. A method comprising:
in a virtual network:
starting a virtual service node configured to provide network traffic services for one or more virtual machines, wherein the virtual service node has at least one associated service profile comprising one or more identifiers for corresponding service policies that define the network traffic services;
retrieving the service policies identified in the at least one associated service profile;
starting a virtual machine with an associated virtual interface;
applying a port profile to the virtual interface, wherein the port profile comprises information configured to identify the service profile to the virtual service node;
providing to the virtual service node information that informs the virtual service node of network parameters and assigned service profile of the virtual machine;
intercepting network traffic associated with the virtual machine; and
redirecting the associated network traffic to the virtual service node in order to provide the network services, wherein the virtual service node is configured for forwarding or dropping the associated network traffic after providing the network services.

2. The method of claim 1, further comprising:
providing by the virtual service node network traffic services for the associated network traffic.

3. The method of claim 1, wherein redirecting comprises routing the associated network traffic via a virtual service node specific overlay tunnel.

4. The method of claim 3, wherein the virtual service node specific overlay tunnel provides one of layer 2 and layer 3 network traffic tunneling.

5. The method of claim 1, further comprising receiving a message from the virtual service node comprising information configured to indicate that the associated network traffic can bypass the virtual service node without being intercepted and redirected, that the associated network traffic is to be dropped, or that the associated network traffic continues to be intercepted and redirected to the virtual service node.

6. The method of claim 1, wherein starting comprises starting a plurality of virtual service nodes each provisioned with a same service profile; and the method further comprising:
sharing network traffic services among the plurality of virtual service nodes.

7. The method of claim 1, wherein starting comprises starting a plurality of virtual service nodes each provisioned with a different service profile; and the method further comprising:
routing the associated network traffic to each of the plurality of virtual service nodes, respectively.

8. The method of claim 1, further comprising:
migrating the virtual machine from a first network device to a second network device; and
providing by the virtual service node network traffic services for the associated network traffic by way of an overlay tunnel and a switch configured to switch network traffic between the first and second network devices.

9. The method of claim 1, further comprising:
migrating the virtual service node from a first network device to a second network device; and
providing network traffic services by the virtual service node for the network traffic by way of a switch configured to switch network traffic between the first and second network devices.

10. The method of claim 1, further comprising, at a virtual network management center:
defining and storing information representing a plurality of service policies; and
defining and storing information representing a plurality service profiles comprising one or more identifiers for corresponding service policies for one or more virtual service nodes configured to provide network traffic services.

11. The method of claim 1, further comprising:
generating information representing the port profile; and
assigning the service profile to the port profile prior to applying the port profile to the virtual interface.

12. The method of claim 1, wherein retrieving comprises retrieving policies from a central store associated with a virtual network management center.

13. The method of claim 1, further comprising starting or stopping virtual service nodes in response to network traffic conditions.

14. An apparatus comprising:
one or more network interfaces configured to interface with one or more network appliances; and
a processor coupled to the one or more network interfaces, and configured to:
start a virtual service node configured to provide network traffic services for one or more virtual machines, wherein the virtual service node has at least one associated service profile comprising one or more identifiers for corresponding service policies that define the network traffic services;

retrieve the service policies identified in the at least one associated service profile;

start a virtual machine with an associated virtual interface;

apply a port profile to the virtual interface, wherein the port profile comprises information configured to identify the service profile to the virtual service node;

provide information to the virtual service node that informs the virtual service node of network parameters and assigned service profile of the virtual machine;

intercept network traffic associated with the virtual machine; and redirect the associated network traffic to the virtual service node in order to provide the network services, wherein the virtual service node is configured to forward or drop the associated network traffic after providing the network services.

15. The apparatus of claim 14, wherein the processor is configured to redirect the associated network traffic via a virtual service node specific overlay tunnel.

16. The apparatus of claim 14, wherein the processor is further configured to receive a message from the virtual service node comprising information configured to indicate that the associated network traffic can bypass the virtual service node without being intercepted and redirected, that the associated network traffic is to be dropped, or that the associated network traffic continues to be intercepted and redirected to the virtual service node.

17. The apparatus of claim 14, wherein the processor is further configured to:
start a plurality of virtual service nodes each provisioned with a same service profile; and
share network traffic services among the plurality of virtual service nodes.

18. The apparatus of claim 14, wherein the processor is further configured to:
start a plurality of virtual service nodes each provisioned with a different service profile; and
route the associated network traffic to each of the plurality of virtual service nodes, respectively.

19. The apparatus of claim 14, wherein the processor is further configured to:
migrate the virtual machine from a first network device to a second network device.

20. One or more non-transitory computer readable storage media storing instructions that, when executed by a processor, cause the processor to:

start a virtual service node configured to provide network traffic services for one or more virtual machines, wherein the virtual service node has at least one associated service profile comprising one or more identifiers for corresponding service policies that define the network traffic services;

retrieve the service policies identified in the at least one associated service profile;

start a virtual machine with an associated virtual interface;

apply a port profile to the virtual interface, wherein the port profile comprises information configured to identify the service profile to the virtual service node;

provide information to the virtual service node that informs the virtual service node of network parameters and assigned service profile of the virtual machine;

intercept network traffic associated with the virtual machine; and redirect the associated network traffic to the virtual service node in order to provide the network services, wherein the virtual service node is configured to forward or drop the associated network traffic after providing the network services.

21. The non-transitory computer readable storage media of claim 20, wherein the instructions operable to redirect comprise instructions operable to route the associated network traffic via a virtual service node specific overlay tunnel.

22. The non-transitory computer readable storage media of claim 20, further comprising instructions that, when executed by a processor, cause the processor to receive a message from the virtual service node comprising information configured to indicate that the associated network traffic can bypass the virtual service node without being intercepted and redirected, that the associated network traffic is to be dropped, or that the associated network traffic continues to be intercepted and redirected to the virtual service node.

23. The non-transitory computer readable storage media of claim 20, further comprising instructions that, when executed by a processor, cause the processor to:
start a plurality of virtual service nodes each provisioned with a same service profile; and
share network traffic services among the plurality of virtual service nodes.

24. The non-transitory computer readable storage media of claim 20, further comprising instructions that, when executed by a processor, cause the processor to:
start a plurality of virtual service nodes each provisioned with a different service profile; and
route the associated network traffic to each of the plurality of virtual service nodes, respectively.

* * * * *